United States Patent [19]

Laube

[11] Patent Number: 5,333,633
[45] Date of Patent: Aug. 2, 1994

[54] ANIMAL GROOMING CLEANING DEVICE

[76] Inventor: Kim Laube, 15041 Broadmoor St., Sepulveda, Calif. 91343

[21] Appl. No.: 19,910

[22] Filed: Feb. 19, 1993

[51] Int. Cl.$^5$ .............................................. B08B 3/10
[52] U.S. Cl. ..................... 134/182; 134/188; 134/192; 206/207; 206/520; 206/561
[58] Field of Search ............... 134/92, 158, 182, 183, 134/188, 192, 89, 201; 206/207, 209, 520, 561, 581; 422/300

[56] References Cited

U.S. PATENT DOCUMENTS

| 1,927,943 | 9/1933 | Long | 134/188 |
|---|---|---|---|
| 2,127,682 | 8/1938 | Ewing | 206/209 |
| 2,267,580 | 12/1941 | Turner | 134/158 |
| 2,302,698 | 11/1942 | Kessel | 206/561 X |
| 2,416,475 | 2/1947 | Friedman | 134/158 X |
| 2,886,046 | 5/1959 | DuGal | 134/158 X |
| 2,973,289 | 2/1961 | Cropp et al. | 134/92 X |
| 2,994,329 | 8/1961 | Catlin et al. | 134/158 X |
| 3,182,668 | 5/1965 | Hartsell | 134/158 X |
| 3,450,391 | 6/1969 | Morris | 134/192 X |
| 3,974,843 | 8/1976 | Aubert | 134/92 X |
| 4,616,748 | 10/1986 | Thomas et al. | 134/92 X |

FOREIGN PATENT DOCUMENTS 684285 3/1965 Italy ..................... 134/190

Primary Examiner—Philip R. Coe
Attorney, Agent, or Firm—Dennis W. Beech

[57] ABSTRACT

An improved animal grooming clipper cleaning, storing and transporting unit that has a top that seals to a base and an internal separation unit that separates clipper head assemblies placed within the separation unit, a strainer to allow grooming clipper parts to drain free of cleaning solution, a motor to agitate the cleaning solution and are capable of being interlocked to stick several assemblies.

4 Claims, 1 Drawing Sheet

ANIMAL GROOMING CLEANING DEVICE

FIELD OF INVENTION

This invention relates to an animal grooming clipper blade assembly cleaning device that includes cleaning storage and use as a carrier.

DESCRIPTION OF PRIOR ART

The improved animal grooming clipper blade assembly cleaning device provides a device that allows easy cleaning and storage of animal grooming clipper blade assemblies. In use a number of animal grooming clipper blade assemblies are required. There are no current means of conveniently cleaning, disinfecting, storing and carrying the blade assemblies. It is necessary for proper use of animal grooming clippers to keep the clipper blade assemblies clean and sterile. The instant invention also provides a convenient device for storing and transporting the clipper blade assemblies and prevents the blades from coming in contact with other blades which would cause them to break.

SUMMARY OF THE INVENTION

The objective of the instant invention is to provide an improved animal grooming clipper cleaning and carrying device that allows the user to clean or chemically disinfect the clipper blade assemblies as well as serve as a convenient storage and carrying case for the clipper blade assemblies. In application the animal groomer is required to have many clipper blade assemblies. Each assembly is for a different specific application. The instant invention includes a clipper blade assembly separation unit that allows separation of the individual clipper blade assemblies to assure proper cleaning and prevent damage and breakage to the clipper blades. Other objectives of this invention will become apparent when the description and drawings are reviewed.

DESCRIPTION OF THE PREFERRED EMBODIMENT

Figure 1:
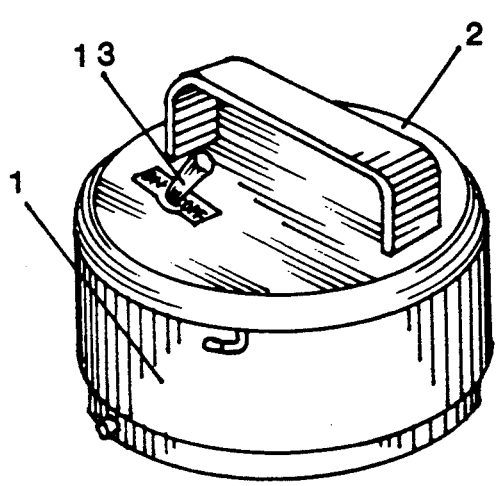
FIG. 1 is an illustrative isometric view of the complete cleaning unit when closed.
Figure 2:
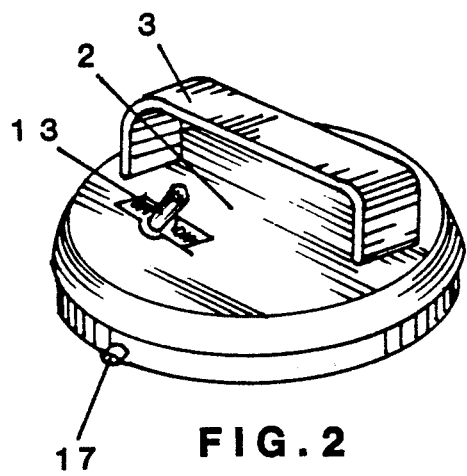
FIG. 2 is an illustrative isometric view of the top of the cleaning unit separated from the complete assembly.
Figure 3:
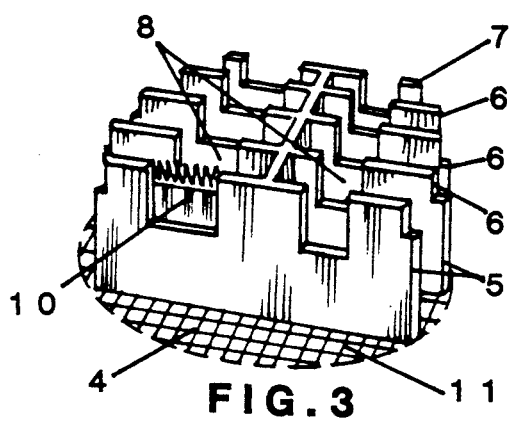
FIG. 3 is an illustrative isometric view of the separation assembly separated from the cleaning unit.
Figure 4:
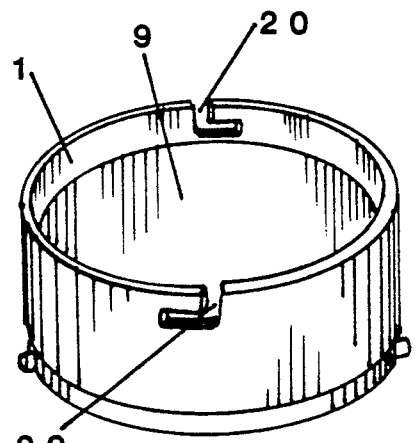
FIG. 4 is an illustrative isometric view of the bottom portion of the cleaning unit.
Figure 5:
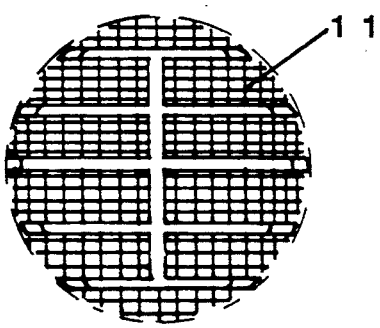
FIG. 5 is a front view of the complete cleaning unit.
Figure 6:
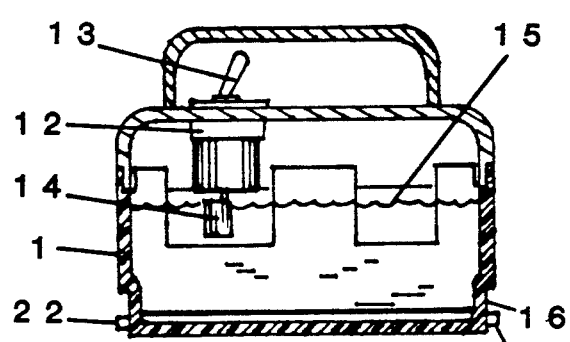
FIG. 6 is a top view of the separation strainer removed from the bottom of the separation unit.
Figure 7:
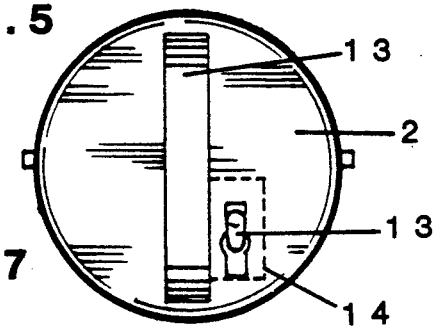
FIG. 7 is a top view of the complete cleaning unit.

Referring to FIGS. 1 through 7, the shape of the instant invention can be seen. The instant invention is formed in cylindrical shape at the base (1) which base (1) has an opening (9). A top cover (2) is sealed to the base (1). The seal is sufficient to prevent disinfecting chemicals placed within the device from escaping. The internal clipper blade separation unit (4) is placed within the base (1). The separation unit ( 4 ) al lows placement of individual clipper blade assemblies (10) to be placed vertically within the separation unit (4). The separation unit (4) has a plurality of compartments (8) to hold the clipper blade assemblies (10) vertically. The compartments (8) are formed by a plurality of spacing walls (5, 6, 7). The walls (5, 6, 7) are sufficiently wide to fit against the sides of the base (1) and of sufficient height to be held snugly in place when the top cover (2) is in place. The walls (5, 6, 7) are separated sufficiently to allow the clipper blade assembly (10) to easily fit between the walls. The separation walls (5, 6, 7) have sufficient openings to allow the users fingers to grasp the top of the clipper blade assembly (10) and lift the clipper blade assembly (10) clear yet small enough to prevent the clipper blade assembly (10) from coming out of the individual compartment (8) formed by the separation walls (5, 6, 7) in which it has been placed. Sufficient apertures are provided between the compartments to assure that a chemical cleaner placed within the cleaning unit may circulate freely. A separation unit strainer (11) is attached to the bottom of the separation unit (4) to allow the fluid (15) to drain when the separation unit (4) is withdrawn. In use several clipper blade assemblies (10) may be placed inside the cleaning unit and either allowed to soak or the cleaning unit may be shaken. When closed, the unit may be vigorously shaken to assure movement of the liquid to clean hair and other debris from the clipper blade assemblies (10) or the battery operated electric vibrating motor (12) with eccentric stirring paddle (14) located in cover can be turned on by switching the power switch (13) to automatically clean clipper blade assemblies (10) by agitation at high speed. Clipper blade assemblies (10) may also be conveniently stored in the unit as well as transported without risk of the clipper blade assemblies (10) hitting each other. With the top cover (2) off the clipper blade assembly (10) may be easily removed for use.

The top cover (2) is attached by a twisting motion with two external protrusions (17, 18) on the top cover (2) fitting in mating slots (20, 21) on the base (1). Additional protrusions (22, 23) on the lower edge or bottom (16) of the base (1) allow a plurality of bases (1) to be stacked. The locking cover design prevents moisture from entering the unit during storage and causing rust or other contamination.

I claim:

1. An improved animal grooming clipper blade assembly cleaning and storage device comprising:
   a. a cylindrical base with an interior compartment having an opening defined therein;
   b. a top that fits and locks to the base by a twisting movement and seals to the base sufficiently to prevent chemicals placed inside the interior of the base from escaping and which top has a handle;
   c. a separation unit that fits into the cylindrical base that allows separation of animal grooming clipper blades placed inside the separation unit which separation unit is formed by a plurality of vertical walls each spaced sufficiently apart to allow an animal grooming blade assembly to be placed between the walls and having sufficient apertures defined therein between the walls to allow the easy flow of chemicals placed inside the sealed device and having sufficient apertures in each wall to allow the clipper blade to be grasped by the use's fingers; and
   d. a bottom of the cylindrical base locks to the opening of another similar base such that a plurality of cylindrical bases may be stacked.

2. The device according to claim 1 wherein the device is made of chemical resistant plastic.

3. The device according to claim 1 wherein the device includes a battery operated motor and an eccentric stirring paddle attached to the top in such a way that when the motor is switched on the eccentric stirring paddle moves a fluid.

4. The device as in claim 1 wherein there is a unit strainer attached to the separation unit.

* * * * *